United States Patent
Mansbery

(10) Patent No.: US 9,382,464 B2
(45) Date of Patent: Jul. 5, 2016

(54) DEICING COMPOSITION AND METHODS OF MAKING THE SAME

(71) Applicant: Nature's Own Source, LLC, Brecksville, OH (US)

(72) Inventor: David I. Mansbery, Brecksville, OH (US)

(73) Assignee: NATURE'S OWN SOURCE, LLC, Brecksville, OH (US)

( * ) Notice: Subject to any disclaimer, the term of this patent is extended or adjusted under 35 U.S.C. 154(b) by 0 days.

(21) Appl. No.: 14/512,645

(22) Filed: Oct. 13, 2014

(65) Prior Publication Data

US 2015/0108394 A1    Apr. 23, 2015

Related U.S. Application Data

(60) Provisional application No. 61/892,765, filed on Oct. 18, 2013, provisional application No. 61/913,993, filed on Dec. 10, 2013.

(51) Int. Cl.
    *C09K 3/18*    (2006.01)
    *C09K 3/22*    (2006.01)

(52) U.S. Cl.
    CPC .. *C09K 3/185* (2013.01); *C09K 3/22* (2013.01)

(58) Field of Classification Search
    CPC .................................. C09K 3/18; C09K 3/185
    See application file for complete search history.

(56) References Cited

U.S. PATENT DOCUMENTS 7,658,861 B2    2/2010  Koefod

FOREIGN PATENT DOCUMENTS

| RU | 2301243 C1 * | 6/2007 | ............... C09K 3/18 |
|---|---|---|---|
| RU | 2313553 C1 * | 12/2007 | ............... C09K 3/18 |
| WO | WO 2009/122228 A1 * | 10/2009 | ............... C09K 3/18 |
| WO | WO 2009/122265 A1 * | 10/2009 | ............... C09K 3/18 |
| WO | WO 2013/090090 A2 * | 6/2013 | ............... C09K 3/18 |

OTHER PUBLICATIONS

Derwent-Acc-No: 2013-S00103, abstract of Korean Patent Specification No. KR 1315618 B1 (Oct. 2013).*

* cited by examiner

*Primary Examiner* — Anthony J Green
(74) *Attorney, Agent, or Firm* — Benesch Friedlander Coplan & Aronoff LLP

(57) ABSTRACT

A deicing composition and method of making the same includes an aqueous salt solution comprising sodium chloride, calcium chloride, and magnesium chloride. The aqueous salt solution may be naturally produced from an oil, natural gas, or natural salt water well from siliclastic or chemical sedimentary rock type formation or it may be synthesized. The deicing composition may also include fresh water and a corrosion inhibiting mixture that includes sodium gluconate and triethanolamine.

23 Claims, 2 Drawing Sheets

DEICING COMPOSITION AND METHODS OF MAKING THE SAME

RELATED APPLICATIONS

This application claims priority to U.S. Provisional Patent Application No. 61/892,765, filed on Oct. 18, 2013, and entitled "De-icing Composition and Methods of Making the Same" and U.S. Provisional Patent Application No. 61/913,993, filed on Dec. 10, 2013 and entitled "De-icing Composition and Methods of Making the Same," both of which are herein incorporated in their entirety by reference.

FIELD OF INVENTION

The present disclosure relates to a deicing composition. More particularly, the present disclosure relates to a deicing composition that includes an aqueous solution that is naturally derived from siliclastic or chemical sedimentary rock and a corrosion inhibitor.

BACKGROUND

Deicing agents that can be used to prevent icing or melt ice and snow on roadways are generally made from alkali or alkaline chloride salts. These deicing agents may be provided in the form of a solid salt, solid salt pre-wetted with a liquid, or a salt brine where the solid salt is combined with fresh water and sprayed on the road. These deicing agents have been known to cause corrosion, cake cars with salt dust, and contaminate the surrounding water supply. In addition, millions of gallons of fresh water are fouled in order to create these synthetic brines.

There is a need, however, for a deicing composition that is both environmentally acceptable, easy to use, and effective that doesn't also cause undue damage to cars and pavement.

SUMMARY OF THE INVENTION

In one embodiment, a deicing composition includes a corrosion inhibiting mixture that includes from about 3.0 to about 10% of a 34% by weight solution of sodium gluconate and water and optionally from about 0.5 to about 2.0% triethanolamine. The composition also includes an aqueous solution comprising from about 5.0 to about 12.0% calcium chloride, from about 6.0 to about 16.0% sodium chloride, from about 0.5 to about 4.0% magnesium chloride, and from about 0.2 to about 2.0% potassium chloride. The composition may also include fresh water.

In another embodiment, the aqueous solution may also include iron chloride or potassium chloride and may be a naturally produced water that is derived from siliclastic or chemical sedimentary rock. In an alternative embodiment, the aqueous solution may be synthetic mixture comprising from about 5.0 to about 12.0% calcium chloride, from about 6.0 to about 16.0% sodium chloride, from about 0.5 to about 4.0% magnesium chloride, and from about 0.2 to about 2.0% potassium chloride.

In another embodiment, the deicing composition may be formed by producing a reclaimed aqueous solution comprising sodium chloride, calcium chloride, and magnesium chloride that is naturally derived from an oil, natural gas, or natural salt water well from siliclastic or chemical sedimentary rock type formation, and meets clean water drinking standards except for the salt content. The method also includes combining the reclaimed aqueous solution with fresh water and a corrosion inhibitor that includes sodium gluconate and triethanolamine.

In one embodiment, the method also includes storing a raw aqueous solution in a containment vessel where at least some of the insoluble contaminants in the raw aqueous solution settle to a bottom of the containment vessel, and pumping the raw aqueous solution from the containment vessel under pressure through at least one filter in order to remove any remaining insoluble contaminants to produce the reclaimed aqueous solution.

In one embodiment, the reclaimed aqueous solution that is produced includes from about 5.0 to about 12.0% calcium chloride, from about 6.0 to about 16.0% sodium chloride, and from about 0.5 to about 4.0% magnesium chloride. The reclaimed aqueous solution may also include potassium or iron chloride. The deicing composition may have a pH of between 4.0 and 8.5 and a freezing point of about −15° F. to about −5° F. The deicing composition may also include other acceptable additives that are capable of altering the freezing point of the deicing composition, such as Agro-based additives such as those derived from beet or corn processing, ethanol production, and bio-diesel derived materials such as glycols.

DRAWINGS

DETAILED DESCRIPTION

Figure 1:
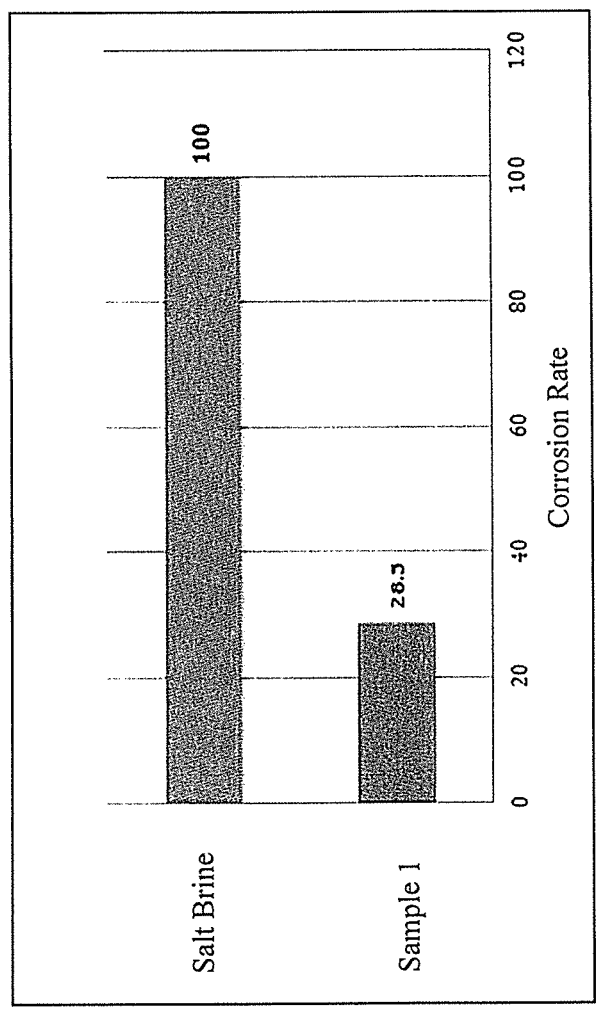
FIG. 1 is a chart showing the percent corrosion of a deicing composition with a corrosion inhibitor according to the description and a 23% salt brine.

A deicing composition may be used to prevent or reduce the amount of snow or ice on a roadway. The composition may also be used as dust suppressant. A deicing composition may include an aqueous salt solution, a corrosion inhibiting mixture, and fresh water. The aqueous salt solution includes a combination of calcium chloride, sodium chloride, and magnesium chloride. Optionally, the aqueous salt solution may also include iron chloride or potassium chloride. In one embodiment, the aqueous salt solution includes from about 5.0 to about 12.0% calcium chloride, from about 6.0 to about 16.0% sodium chloride, and from about 0.5 to about 4.0% magnesium chloride. In one embodiment the aqueous salt solution is synthesized and in another embodiment, it is naturally derived from oil, natural gas, or water wells with productive zones, i.e. "produced water," that are located in siliciclastic or chemical sedimentary rock types, including but not limited to conglomerate, sandstone, shale, siltstone, limestone, and dolostone. Examples of such wells are those found in the Appalachian Foreland Basin stretching from New York to Georgia.

If naturally derived, the produced water may be processed to remove particulates and organic material so that it meets clean drinking standards, as set forth by the US Environmental Protective Agency, except for its salt content. In order to process the produced water, the produced water is removed from siliciclastic or chemical sedimentary rock and transferred to containment vessels. In one embodiment, the produced water is transferred under ambient pressure to bring the water to the surface of the well. This may be done by any acceptable method known to those of skill in the art. Once transferred, the produced water is stored in the containment vessel in order to allow some of the insoluble contaminants to settle. Then, the produced water is pumped from the containment vessel, under up to about fifty (50) pounds of pressure, through a series of filters. For example, the filters may be high efficiency bag filters or cartridge filters or a series of carbon filters. When passed through the filters, the remaining contaminants and organic materials are removed to produce the aqueous salt solution.

Once the aqueous salt solution is obtained, it is combined with a corrosion inhibiting mixture that may include a corrosion inhibiting agent including sodium gluconate, polyhydric carboxylic acids, such as gluconic acid, or mixtures thereof, and optionally a pH modifier, such as triethanolamine, to form the deicing composition. Examples of suitable mixtures of sodium gluconate and carbohydrates include S-45 and S-50, commercially available from PMP Fermentation Products, Inc. Generally, the deicing composition includes about 0.5% to about 10%, and desirably about 1.50% to about 1.75%, by weight in the brine of the corrosion inhibiting mixture and has a pH of between about 4.0 and 8.5. The corrosion inhibiting mixture may be formed by combining from about 3.0 to about 10% of a 34% by weight solution of sodium gluconate and water and optionally about from 0.5 to about 2.0% triethanolamine. The deicing composition also has a freezing point of about −15° F. to about −5° F. In one embodiment, the deicing composition is capable of reducing corrosion of mild steel by at least about 70%, as compared to a 3% solution of sodium chloride, as required to meet the testing and certification requirements of the Pacific Northwest Snowfighters Association (PNS) by TEST METHOD B: Corrosion Rate As Conducted From The NACE Standard TM0169-95 (1995 Revision) And As Modified By The Pacific Northwest States.

The deicing composition may be used as an anti-icing liquid to prevent ice from bonding to a paved surface or as a pre-wetting solution to wet rock salt or other granular deicers or aggregates and reduce "bounce and scatter"—keeping more salt on the roadway. In order to prevent icing, 25 to 75 gallons per lane mile of the deicing composition may be applied to a paved surface up to about 72 hours in advance of a weather event. In one embodiment, the deicing composition is hygroscopic in nature, drawing moisture from the air, which keeps the deicing composition on the paved surface with a slightly wet appearance, and preventing condensing moisture from creating black ice and bonding to the paved surface. And, because of its hygroscopic nature, and unlike typical 23% sodium chloride solutions, the deicing composition containing calcium chloride ($CaCl_2$) reduces dusting and loss of sodium chloride thereby improving the effectiveness of anti-icing applications.

EXAMPLE 1

In one example, about 94 ml of an aqueous salt solution was naturally produced from the Clinton Sandstone rock formation in Cuyahoga, Ohio, as described above. The resulting produced water included about 222000 mg/L of chloride, about 23200 µg/L of sodium, about 44100 µg/L calcium, about 9090 µg/L magnesium, and about 158 µg/L of iron. The produced water had a freezing point of about −8° F.

The produced water was then combined with about 1.0 ml of triethanolamine, which can be obtained commercially from Dow Chemical in Midland, Mich., and about 5.0 ml of a 34% by weight solution of sodium gluconate in water. The sodium gluconate is commercially available from PMP Fermentation Products in Peoria, Ill.

Figure 2:
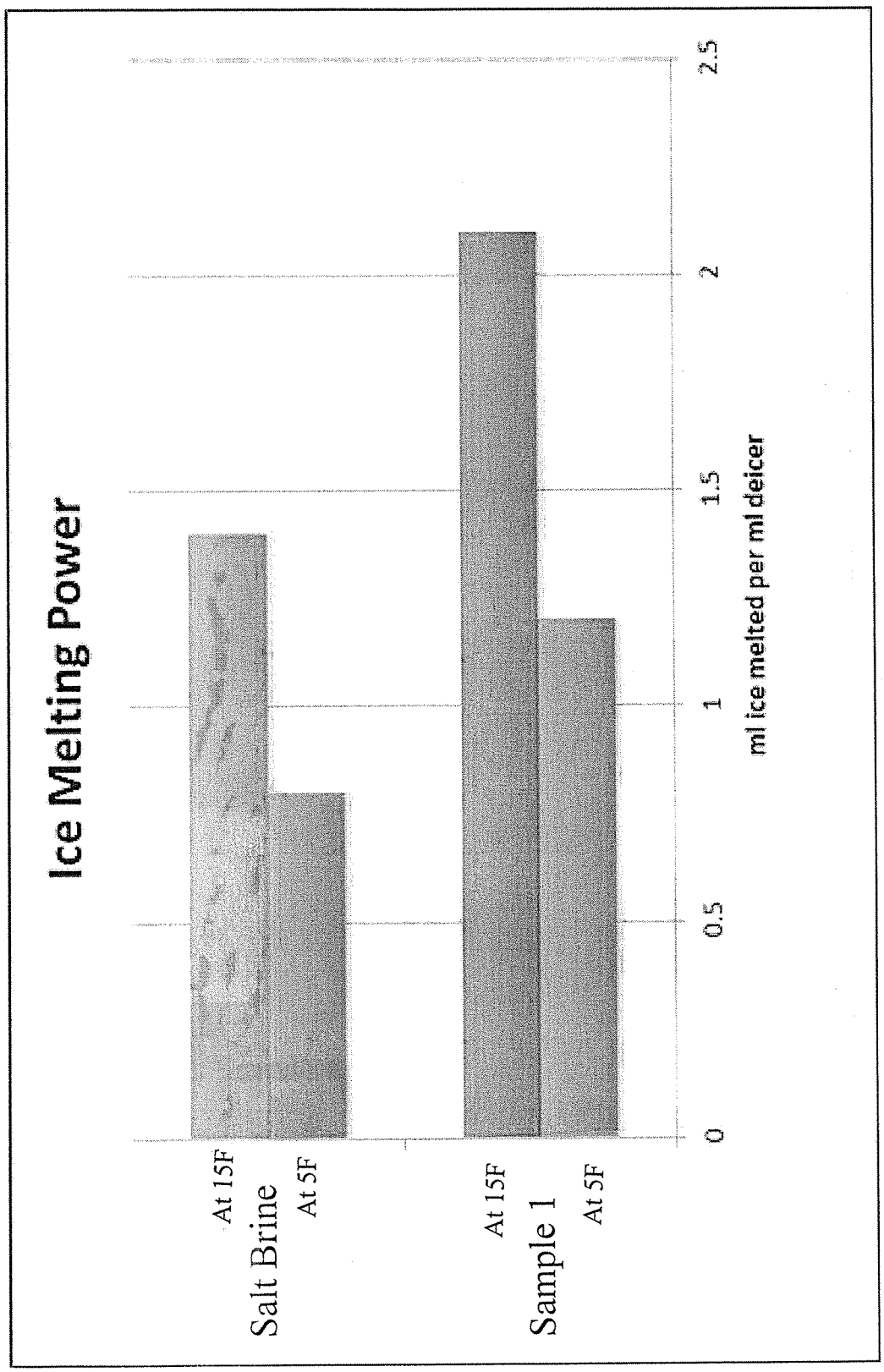
FIG. 2 is a chart showing the ice melting capacity of a deicing composition with a corrosion inhibitor according to the description and a 23% salt brine.

The deicing composition made as described above (Sample 1) was compared to a 23% sodium chloride salt brine to determine the percent (%) corrosion according to the PNS Test Method B and for the relative ice-melting power. As shown in FIG. 1, Sample 1 produced a corrosion rate of about 28.5% compared to the corrosion rate of 100% for the sodium chloride brine. Also, as shown in FIG. 2, over a period of twenty minutes, Sample 1 was capable of melting over 2 ml of ice per 1 ml of deicer at 15° F. and about 1.25 ml per 1 ml of deicer at 5° F. The traditional salt brine, however melted under 1.5 ml and about 0.75 ml, respectively, per 1 ml of brine. It should be recognized that any of the samples of naturally derived aqueous salt solutions described herein, including samples 1-8, could be made in to a deicing composition as described in Example 1.

EXAMPLE 2

Aqueous salt solutions may be naturally produced and may be obtained from a variety of sources. For example, samples 2-9 were obtained from rock formations in Lake, Portage, Summit, Muskingum and Wayne counties in Ohio. As shown in Table I below, each sample was analyzed according to EPA Method 200.7, Determination of Metals and Trace Elements in Water and Wastes by Inductively Coupled Plasma-atomic Emission Spectrometry, to determine the concentration of each salt in solution and ASTM Standard D1293, Standard Test Methods for pH of Water, was used to determine the pH.

Each sample was combined with a quantity of the corrosion inhibiting mixture sufficient to yield a solution with about 5% by total weight of the sample of the corrosion inhibiting mixture and tested according to PNS TEST METHOD B to ensure that it met the PNS testing and certification requirements (PNS Score), as described above. A de-icing composition must score 30 (plus or minus 3%) or less (70% less corrosive than salt) according to this test method to be considered acceptable.

TABLE I

| Sample | CaCl (% wt) | MgCl (% wt) | KCl (% wt) | NaCl (% wt) | pH | Source | PNS Score |
|---|---|---|---|---|---|---|---|
| 2 | 7.32 | 1.20 | 0.23 | 15.2 | 4.2 | Clinton Formation, Lake Co., Ohio | 31.3% |
| 3 | 7.02 | 1.32 | 0.22 | 10.4 | 4.1 | Clinton Formation, Portage Co., Ohio | 27.6% |
| 4 | 7.12 | 1.94 | 0.37 | 10.8 | 5.9 | Clinton Formation, Summit Co., Ohio | 27.8% |
| 5 | 5.93 | 0.88 | 0.29 | 13.4 | 4.8 | Clinton Formation, Muskingum Co., Ohio | 26.4% |

TABLE I-continued

| Sample | CaCl (% wt) | MgCl (% wt) | KCl (% wt) | NaCl (% wt) | pH | Source | PNS Score |
|---|---|---|---|---|---|---|---|
| 6 | 7.48 | 1.21 | 0.21 | 15.0 | 4.4 | Oriskany Formation, Lake Co., Ohio | 28.7% |
| 7 | 8.26 | 1.57 | 0.38 | 14.5 | 4.6 | Trempeleau Formation, Wayne Co., Ohio | 28.9% |
| 8 | 10.3 | 1.80 | 0.64 | 13.7 | 5.9 | Rose Run Formation, Portage Co., Ohio | 28.2% |
| 9 | 10.0 | 1.95 | 0.67 | 12.9 | 6.2 | Rose Run Formation, Muskingum Co., Ohio | 26.8% |

As shown in Table I, samples 2-9 are suitable for use in the de-icing composition. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A deicing composition comprising:
   a corrosion inhibiting mixture comprising about 3.0% to about 10% of a 34% by weight solution of a corrosion inhibiting agent comprising sodium gluconate, gluconic acid, or a combination thereof;
   an aqueous salt solution comprising from about 5.0 to about 12.0% calcium chloride, from about 6.0 to about 16.0% sodium chloride, and from about 0.5 to about 4.0% magnesium chloride; and
   a pH modifier comprising from about 0.5% to about 2.0% triethanolamine.

2. The deicing composition of claim 1, wherein the corrosion inhibiting mixture further comprises polyhydric carboxylic acids or salts thereof.

3. The deicing composition of claim 1, wherein the aqueous salt solution further comprises potassium chloride.

4. The deicing composition of claim 1, wherein the aqueous salt solution is produced from siliciclastic or chemical sedimentary rock.

5. The deicing composition of claim 1, wherein the aqueous salt solution is synthesized.

6. The deicing composition of claim 1, wherein the aqueous salt solution further comprises from about 0.2 to about 2.0% potassium chloride.

7. The deicing composition of claim 1, wherein the deicing composition is capable of reducing corrosion of mild steel by at least about 70%, as compared to a 3% solution of sodium chloride.

8. The deicing composition of claim 1, wherein the deicing composition has a pH of between 4.0 and 8.5.

9. The deicing composition of claim 1, wherein the deicing composition has a freezing point of about −15° F. to about −5° F.

10. The deicing composition of claim 1, wherein the deicing composition has a freezing point less than about −6° F.

11. The deicing composition of claim 1, wherein the deicing composition has a freezing point of about −8° F.

12. A deicing composition formed by the steps of:
    producing an aqueous salt solution comprising from about 5.0 to about 12.0% calcium chloride, from about 6.0 to about 16.0% sodium chloride, and from about 0.5 to about 4.0% magnesium chloride;
    wherein the aqueous salt solution is produced from an oil, natural gas, or natural salt water well from siliciclastic or chemical sedimentary rock formation; and
    combining the aqueous salt solution with a corrosion inhibiting mixture comprising about 3.0% to about 10% of a 34% by weight solution of a corrosion inhibiting agent selected from sodium gluconate, gluconic acid, or a combination thereof; and
    a pH modifier comprising from about 0.5% to about 2.0% by weight of triethanolamine.

13. The deicing composition of claim 12, wherein the corrosion inhibiting agent is sodium gluconate.

14. The deicing composition of claim 12, wherein the corrosion inhibiting mixture further comprises polyhydric carboxylic acids or salts thereof.

15. The deicing composition of claim 12, wherein the producing step includes:
    obtaining a raw aqueous salt solution from siliciclastic or chemical sedimentary rock formations;
    storing the raw aqueous salt solution in a containment vessel and allowing at least some insoluble contaminants in the raw aqueous salt solution to settle to a bottom of the containment vessel; and pumping the raw aqueous salt solution from the containment vessel under pressure through at least one filter in order to remove at least some insoluble contaminants.

16. The deicing composition of claim 15, wherein the raw aqueous salt solution further comprises iron chloride.

17. The deicing composition of claim 15, wherein the raw aqueous salt solution further comprises potassium chloride.

18. The deicing composition of claim 12, wherein the aqueous salt solution comprises from about 0.2 to about 2.0% potassium chloride.

19. The deicing composition of claim 12, wherein the deicing composition is capable of reducing corrosion of mild steel by at least about 70%, as compared to a 3% solution of sodium chloride.

20. The deicing composition of claim 12, wherein the deicing composition has a pH of between 4.0 and 8.5.

21. The deicing composition of claim 12, wherein the deicing composition has a freezing point of about −15° F. to about −5° F.

22. A deicing composition comprising:

a corrosion inhibiting mixture; and an aqueous salt solution comprising from about 5.0 to about 12.0% calcium chloride, from about 6.0 to about 16.0% sodium chloride, from about 0.5 to about 4.0% magnesium chloride; and about 0.2 to about 2.0% potassium chloride.

23. A deicing composition formed by the steps of:

producing an aqueous salt solution comprising from about 5.0 to about 12.0% calcium chloride, from about 6.0 to about 16.0% sodium chloride, from about 0.5 to about 4.0% magnesium chloride, and from about 0.2 to about 2.0% potassium chloride; and combining the aqueous salt solution with a corrosion inhibiting mixture.

* * * * *